(12) United States Patent
Couillard et al.

(10) Patent No.: US 11,803,666 B2
(45) Date of Patent: *Oct. 31, 2023

(54) HARDWARE SECURITY MODULE, AND TRUSTED HARDWARE NETWORK INTERCONNECTION DEVICE AND RESOURCES

(71) Applicant: CRYPTO4A TECHNOLOGIES INC., Gatineau (CA)

(72) Inventors: Bruno Couillard, Gatineau (CA); Bradley Clare Ritchie, Kemptville (CA); James Ross Goodman, Ottawa (CA); Jean-Pierre Fiset, Ottawa (CA)

(73) Assignee: Crypto4A Technologies Inc., Gatineau (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/660,080

(22) Filed: Apr. 21, 2022

(65) Prior Publication Data

US 2022/0318435 A1    Oct. 6, 2022

Related U.S. Application Data

(63) Continuation of application No. 16/697,772, filed on Nov. 27, 2019, now Pat. No. 11,321,493, which is a continuation-in-part of application No. PCT/CA2018/050630, filed on May 30, 2018.

(60) Provisional application No. 62/772,901, filed on Nov. 29, 2018, provisional application No. 62/532,138, (Continued)

(51) Int. Cl.
*G06F 21/72* (2013.01)
*H04L 9/08* (2006.01)
*G06F 21/76* (2013.01)
*G06F 21/87* (2013.01)
(Continued)

(52) U.S. Cl.
CPC .............. *G06F 21/72* (2013.01); *G06F 21/76* (2013.01); *G06F 21/78* (2013.01); *G06F 21/85* (2013.01); *G06F 21/87* (2013.01); *H04L 9/0897* (2013.01)

(58) Field of Classification Search
None
See application file for complete search history.

(56) References Cited

U.S. PATENT DOCUMENTS

| | | |
|---|---|---|
| 5,088,091 A | 2/1992 | Schroeder et al. |
| 5,521,909 A | 5/1996 | Holloway et al. |

(Continued)

FOREIGN PATENT DOCUMENTS

| | | |
|---|---|---|
| CN | 113120490 | 7/2021 |
| WO | WO 2007010333 | 1/2007 |
| WO | WO 2016099644 | 6/2016 |

OTHER PUBLICATIONS

Lubos Gaspar et al. HCrypt: A Novel Concept of Crypto-Processor with Secured Key Management, Dec. 12, 2010, pp. 280-285.

(Continued)

*Primary Examiner* — Michael Pyzocha
(74) *Attorney, Agent, or Firm* — Knobbe, Martens, Olson & Bear, LLP

(57) ABSTRACT

Described are various embodiments of a hardware security module, hardwired port interconnection matrix, and embedded communication channel resources operable on selected hardware port-specific data communicated via this matrix.

16 Claims, 11 Drawing Sheets

Related U.S. Application Data filed on Jul. 13, 2017, provisional application No. 62/513,103, filed on May 31, 2017.

(51) Int. Cl.
  *G06F 21/85* (2013.01)
  *G06F 21/78* (2013.01)

(56) References Cited

U.S. PATENT DOCUMENTS

| | | | |
|---|---|---|---|
| 7,636,844 B2 * | 12/2009 | Bajikar | G06F 21/78 380/47 |
| 8,160,244 B2 | 4/2012 | Buer | |
| 8,572,673 B2 | 10/2013 | Duffy | |
| 8,631,247 B2 | 1/2014 | O'Loughlin et al. | |
| 8,782,767 B2 | 7/2014 | Hill | |
| 8,826,039 B2 | 9/2014 | Chou et al. | |
| 9,071,446 B2 | 6/2015 | Kreft | |
| 9,183,158 B2 | 11/2015 | O'Loughlin et al. | |
| 9,355,279 B1 | 5/2016 | Takahashi | |
| 9,355,280 B2 | 5/2016 | Chou et al. | |
| 9,461,826 B2 | 10/2016 | Kreft | |
| 9,524,399 B1 | 12/2016 | Takahashi | |
| 9,571,279 B2 | 2/2017 | Kancharla et al. | |
| 9,674,158 B2 | 6/2017 | Korondi et al. | |
| 9,678,896 B2 | 6/2017 | O'Loughlin et al. | |
| 9,864,874 B1 | 1/2018 | Shanbhag et al. | |
| 9,893,898 B2 | 2/2018 | Kreft | |
| 10,114,766 B2 | 10/2018 | Takahashi | |
| 10,445,509 B2 * | 10/2019 | Thota | G06F 21/602 |
| 10,491,569 B1 | 11/2019 | Powell, III | |
| 10,587,450 B1 * | 3/2020 | Hartley | H04L 45/04 |
| 10,708,236 B2 | 7/2020 | Takahashi | |
| 10,778,641 B2 | 9/2020 | Bond et al. | |
| 2005/0246529 A1 * | 11/2005 | Hunt | H04L 9/3263 713/168 |
| 2006/0059372 A1 | 3/2006 | Fayar et al. | |
| 2006/0072748 A1 | 4/2006 | Buer | |
| 2006/0072762 A1 | 4/2006 | Buer | |
| 2007/0192629 A1 | 8/2007 | Saito | |
| 2008/0216147 A1 | 9/2008 | Duffy | |
| 2008/0307499 A1 | 12/2008 | Hill | |
| 2009/0158050 A1 * | 6/2009 | Quintana | H04L 63/105 713/189 |
| 2011/0010720 A1 | 1/2011 | Smith et al. | |
| 2011/0191599 A1 | 8/2011 | Chou et al. | |
| 2012/0102334 A1 | 4/2012 | O'Loughlin et al. | |
| 2012/0151223 A1 | 6/2012 | Marques et al. | |
| 2012/0166576 A1 | 6/2012 | Orsini et al. | |
| 2012/0166806 A1 | 6/2012 | Zhang et al. | |
| 2013/0061310 A1 | 3/2013 | Whitmyer | |
| 2013/0219164 A1 | 8/2013 | Hamid | |
| 2014/0010371 A1 | 1/2014 | Khazan et al. | |
| 2014/0108786 A1 | 4/2014 | Kreft | |
| 2014/0108825 A1 | 4/2014 | O'Loughlin et al. | |
| 2014/0282936 A1 | 9/2014 | Fitzgerald | |
| 2015/0052367 A1 | 2/2015 | Chou et al. | |
| 2015/0161415 A1 | 6/2015 | Kreft | |
| 2015/0227932 A1 | 8/2015 | Huxham et al. | |
| 2015/0229614 A1 * | 8/2015 | Thompson | H04L 9/0656 713/168 |
| 2015/0358161 A1 | 12/2015 | Kancharla | |
| 2015/0358294 A1 | 12/2015 | Kancharla et al. | |
| 2015/0358311 A1 | 12/2015 | Kancharla et al. | |
| 2015/0358312 A1 | 12/2015 | Kancharla et al. | |
| 2015/0358313 A1 | 12/2015 | Hussain et al. | |
| 2016/0019050 A1 | 1/2016 | Marr et al. | |
| 2016/0028551 A1 | 1/2016 | Hussain et al. | |
| 2016/0048462 A1 | 2/2016 | O'Loughlin et al. | |
| 2016/0105429 A1 | 4/2016 | Boenisch et al. | |
| 2016/0149877 A1 | 5/2016 | Kancharla et al. | |
| 2016/0350721 A1 * | 12/2016 | Comerford | H04L 67/306 |
| 2016/0359635 A1 | 12/2016 | Kreft | |
| 2016/0359636 A1 | 12/2016 | Kreft | |
| 2017/0034133 A1 | 2/2017 | Korondi et al. | |
| 2017/0075821 A1 | 3/2017 | Takahashi | |
| 2017/0090007 A1 | 3/2017 | Park et al. | |
| 2017/0103204 A1 | 4/2017 | Mitola, III | |
| 2017/0213218 A1 | 7/2017 | Pickering et al. | |
| 2017/0244678 A1 | 8/2017 | Korondi et al. | |
| 2017/0346623 A1 * | 11/2017 | Bill | H04L 63/045 |
| 2017/0351879 A1 | 12/2017 | Sion | |
| 2018/0004953 A1 | 1/2018 | Smith et al. | |
| 2018/0091311 A1 | 3/2018 | Kisley | |
| 2018/0167204 A1 | 6/2018 | Wall et al. | |
| 2019/0319920 A1 | 10/2019 | Ellis | |
| 2020/0304160 A1 | 9/2020 | Hoang | |

OTHER PUBLICATIONS

Written Opinion of the International Searching Authority in PCT/CA2019/051638 dated Mar. 17, 2020 in 4 pages.
International Search Report in PCT/CA2019/051638 dated Mar. 17, 2020 in 3 pages.
CryptoServer Se-Series Gen2, Non-Proprietary Security Policy, Document No. 2014-0001, Version: 1.2.0, Jan. 4, 2017, Ultimaco IS GmbH, Germany.
FIPS 140-2 Level 3 Non-Proprietary Security Policy Nitroxiii CNN35XX-NFBE HSM Family, Version 2.0.5, Mar. 30, 2017, Cavium.
International Search Report for PCT/CA2018/050630.
International Search Report for PCT/CA2018/050635.
Level 3 Non-Proprietary Security Policy For Luna(R) PCI-E Cryptographic Module and Luna(R) PCI-E Cryptographic Module for Luna(R) SA, 002-500004-001, Revision 20, Aug. 10, 2015, pp. 1-46, SafeNet Assured Technologies, LLC.
SafeNet Network HSM (Formely SafeNet Luna SA), Product Brief, Jan. 29, 2016, pp. 1-2, Gemalto.
Securing Network-Attached HSMs: The SafeNet Luna SA Three-Layer Authentification Model White Paper, 2010, pp. 1-9, Gemalto.
Thales nShield HSM Security Policy, Version 4.6, May 3, 2016, Thales UK Limited and Thales e-Security.
Ultra Electronics AEP's Advanced Configurable Cryptographic Environment (ACCE) v3 HSM Crypto Module, FIPS 140-2 Non-Proprietary Security Policy Issue 23, 2017, pp. 1-37, Ultra Electronics AEP.
Written Opinion for PCT/CA2018/050630.
Written Opinion for PCT/CA2018/050635.
Extended European Search Report for EP Patent Application 19890091.2, dated Jul. 15, 2022, 8 pages.
Network Segmentation in Virtualized Environments, VMWARE, Best Practices, Revision: May 19, 2009 (2009), https://www.vmware.com/content/dam/digitalmarketing/vmware/en/pdf/techpaper/network_segmentation.pdf.

* cited by examiner

HARDWARE SECURITY MODULE, AND TRUSTED HARDWARE NETWORK INTERCONNECTION DEVICE AND RESOURCES

FIELD OF THE DISCLOSURE

The present disclosure relates to trusted network infrastructures, and, in particular, to a hardware security module (HSM), and trusted hardware network interconnection device and resources.

BACKGROUND

The provision, customization and management of secure network infrastructure is an ongoing challenge in the provision of secure, accurate and reliable network services and resources, for example, as there is an ongoing and increasing desire for such services and resources.

As one example, hardware security modules (HSM) are known to provide a physical computing device that safeguards and manages digital keys for digital system authentication and cryptographic processing. For example, HSMs routinely form part of mission-critical infrastructures such as public key infrastructures or online banking applications. These modules traditionally come in the form of a plug-in card, or an external device that attaches directly to a computer or network server.

In external device implementations, a hardware processor and storage device is provided within a tamper-resistant casing or the like so to minimize unauthorized access and hardware tampering, while also occasionally providing tamper evidence logging. An external input/output interface is provided via PCMCIA (Personal Computer Memory Card International Association), PC Card interface, Smart Card interface, USB port, or any other communication interface that may be design specific and that links to an internal memory used for storing private keys and like data in an associated key space, and a cryptographic engine for processing these keys for an intended purpose (authentication and/or authorization, encryption/decryption, etc.). A PCI or PCIe (Peripheral Component Interconnect Express) interface can alternatively be provided to result in a similar implementation. Using this approach, various HSMs may be interconnected within a network architecture to provide various data security services, generally, in a one-to-one fashion (i.e. one HSM per network security function).

In network implementations, a network attached HSM may take the form of a standard HSM communicatively linked to an appliance server (e.g. application layer interface) or the like that intermediates access to the HSM and can thus allow a same network attached HSM to interface with distinct services. For instance, HSM access software executed on the appliance server can sort through various inbound requests received from distinct network-accessible sources and channels and manage processing of such requests by the HSM over a singular server-HSM channel. Ultimately, the HSM is executed in response to the appliance server and thus generally remains blind to the sorting and management functions of the appliance server.

The SafeNet Luna SA/Network HSM (Gemalto, Belcamp, MD, e.g. see https://safenet.gemalto.com/data-encryption/hardware-security-modules-hsms/safenet-network-hsm/) provides one example of a network HSM in which multiple HSM hardware storage partitions can be defined to secure corresponding cryptographic keys. These keys are stored to service corresponding network applications via an onboard access software that provides the network linking services on the appliance, that executes programmed logic to interface with the partitioned key spaces on one side, and the various network applications on the other via corresponding secured network connections (i.e. SSL). Accordingly, a common HSM network interface can be used to concurrently service various network applications or clients over respective secure network connections thereto, while also providing partitioned storage solutions to store application-specific keys in distinct storage partitions.

A few of the HSMs available in the market today have the ability to execute specially developed modules within the HSM's secure enclosure. Such ability is useful, for example, in cases where special algorithms or business logic has to be executed in a secured and controlled environment. For example, HSMs provided by Thales e-Security (Plantation, FL, e.g. see https://www.thales-esecurity.com/products-and-services/products-and-services/hardware-security-modules) promote the ability to host critical applications within the HSM's security boundary so to establish tamper-resistant business processes (i.e. executed within a generally anti-tamper running environment) in addition to protecting cryptographic operations.

U.S. Patent Application publication No. 2013/0219164 describes Cloud-Based Hardware Security Modules in which a cloud-based HSM provides core security functions of a physically controlled HSM, such as a USB HSM, while allowing user access within the cloud and from a user device, including user devices without input ports capable of direct connection to the HSM. The HSMs can be connected to multi-HSM appliances on the organization or user side of the cloud network, or on the cloud provider side of the cloud network. HSMs can facilitate multiple users, and multi-HSM appliances can facilitate multiple organizations.

International Application publication No. WO 2016/099644 describes Systems and Methods for Using Extended Hardware Security Modules that possess additional security properties relative to conventional HSMs and methods for initializing, deploying, and managing such extended HSMs in a networked environment. An extended HSM is described to generally include additional hardware and software components that configure it to run sensitive client tasks on demand inside a cloud-hosted, anti-tamper HSM housing so as to ensure sensitive data is encrypted when stored or processed outside the housing. By deploying virtualization technology inside the extended HSM, virtual HSMs may be implemented as virtual machines or more efficient lightweight operating system-level virtualized containers. As such, a single extended HSM host may run one or more virtualized extended HSM guests in respective virtualized spaces. Namely, a host HSM may provide a virtual network interface functionality to a guest using its underlying hardware network interface to implement the provided network interface functionality.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concept(s) described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims.

A need exists for a hardware security module that overcomes some of the drawbacks of known techniques, or at least, provides a useful alternative thereto. Some aspects of this disclosure provide examples of such hardware security modules A further or alternative need exists for a trusted hardware network interconnection device and resources that overcomes some of the drawbacks of known techniques, or at least, provides a useful alternative thereto. Some aspects of this disclosure provide examples of such devices and related processes.

In accordance with one aspect, there is provided a trusted hardware network interconnection device and resources.

In accordance with another aspect, there is provided a hardware security module, hardwired port interconnection matrix, and embedded communication channel resources operable on selected hardware port-specific data communicated via this matrix.

In accordance with another aspect, there is provided a hardware security module comprising: two or more hardware ports, each one of which operable to electronically receive given input hardware port-specific cryptographic data thereon to initiate execution of an internal cryptographic process as a function thereof; two or more segregated hardware port-specific storage spaces each operatively linked to a corresponding one of said hardware ports via a corresponding hardware link, and storing respective secured hardware port-specific cryptographic data thereon exclusively retrievable as a function of said given input hardware port-specific cryptographic data corresponding thereto; and a cryptographic engine operable to execute said cryptographic process based on said secured port-specific cryptographic data retrieved from said segregated hardware port-specific storage media as a function of said given input port-specific cryptographic data.

In one embodiment, each of said segregated hardware port-specific storage media comprise distinctly embedded storage media operatively hardwired to said corresponding one of said hardware ports.

In one embodiment, each of said segregated hardware port-specific storage media comprises distinct partitions of a common embedded storage media each operatively hardwired to said corresponding one of said hardware ports.

In one embodiment, the hardware security module further comprises an embedded processing system operable to execute said cryptographic engine.

In one embodiment, the embedded processing system comprises a dedicated processing core.

In one embodiment, the hardware ports, said segregated hardware port-specific storage media and said cryptographic engine are hardwired within a common integrated circuit architecture.

In one embodiment, the common integrated circuit architecture is implemented in a field-programmable gate array (FPGA).

In one embodiment, a same said cryptographic engine is commonly operable to execute a same said cryptographic process for each of said secured port-specific cryptographic data irrespective of hardware port-specificity.

In one embodiment, the cryptographic engine comprises distinct hardware port-specific cryptographic engines.

In one embodiment, each of said distinct hardware port-specific cryptographic engines is associated with a corresponding one of said segregated hardware-port specific storage spaces.

In one embodiment, the corresponding one of said segregated hardware-port specific storage spaces is exclusively accessible via a hardware link operatively defined through said associated one of said distinct hardware port-specific cryptographic engines.

In one embodiment, the hardware security module further comprises a hardwired port interconnection (i.e. trusted communication) matrix that operatively interconnects at least some of said hardware ports in accordance with predefined hardwired port-specific logic.

In one embodiment, the interconnection matrix is reconfigurable to redefine said hardwired port-specific logic.

In one embodiment, the port interconnection matrix is further configured to invoke one or more embedded communication channel resources operable on selected hardware port-specific data communicated via said matrix.

In one embodiment, the one or more communication channel resources comprise an inline channel encryption resource executed distinctly from said cryptographic engine.

In one embodiment, the cryptographic engine is operable to execute a control plane cryptographic process, whereas said inline channel encryption resource is operable to execute a communication plane cryptographic process subsequent to successful execution of said control plane cryptographic process.

In one embodiment, the control plane cryptographic process comprises a new session initiation process invoking a private key stored in said segregated port-specific storage space, whereas said communication plane cryptographic process comprises an in-session cryptographic process invoking a distinct session key.

In one embodiment, the one or more communication channel resources comprise at least one of an inline channel cryptographic resource, a data channel diode resource, a data channel filter resource, a data channel comparator resource, and a data channel sniffer resource.

In one embodiment, the module is a single-chip module.

In one embodiment, at least some said corresponding hardware link is implemented via common embedded hardware logic.

In one embodiment, the two or more segregated hardware port-specific storage spaces comprise one or more externally integrated hardware storage resources.

In one embodiment, the one or more communication channel resources comprise a trusted metering function. In one such embodiment, the trusted metering function is operable to track transactions (data, events, requests) communicated on a given hardware channel and output cryptographically authenticated metering messages accordingly.

In one embodiment, the one or more communication channel resources comprise a trusted flow control function. In one such embodiment, the trusted flow control function is operable to apply cryptographically authenticated flow control restrictions on transactions (data, events, requests) communicated on a given hardware channel.

In one embodiment, the one or more communication channel resources comprise a trusted function expander, wherein a data transaction relayed or triggered on a given input hardware channel is securely distributed and synchronized across multiple output hardware channels.

In one embodiment, the one or more communication channel resources comprise a trusted controllable event counter. In one such embodiment, the trusted controllable event counter is operable to apply cryptographically authenticated control over a designated event counting threshold thereof such that a trigger invoked upon reaching said threshold is securely adjustable. In one further such embodiment, the trusted controllable event counter is operatively associated with an onboard clock frequency signal to securely adjust output timing data associated therewith.

In accordance with another aspect, there is provided a single-chip hardware security module comprising: two or more hardware ports, each one of which operable to electronically receive given input hardware port-specific cryptographic data thereon to initiate execution of an internal cryptographic process as a function thereof; two or more segregated hardware port-specific storage media spaces each operatively linked to a corresponding one of said hardware ports via a corresponding hardware link, and storing respective secured hardware port-specific cryptographic data thereon exclusively retrievable as a function of said given input hardware port-specific cryptographic data corresponding thereto; and a cryptographic engine operable to execute said cryptographic process based on said secured port-specific cryptographic data retrieved from said segregated hardware port-specific storage media as a function of said given input port-specific cryptographic data.

In one embodiment, each of said segregated hardware port-specific storage media comprise distinctly embedded storage media operatively hardwired to said corresponding one of said hardware ports.

In one embodiment, the single-chip hardware security module further comprises an embedded processing system operable to execute said cryptographic engine.

In one embodiment, the module is implemented in a field-programmable gate array (FPGA).

In one embodiment, the single-chip hardware security module further comprises a hardwired port interconnection matrix that operatively interconnects at least some of said hardware ports in accordance with predefined hardwired port-specific logic.

In one embodiment, the interconnection matrix is (dynamically) reconfigurable to redefine said hardwired port-specific logic.

In accordance with another aspect, there is provided a hardware security module comprising: two or more hardware ports, each one of which operable to electronically receive given input hardware port-specific cryptographic data thereon to initiate execution of an internal cryptographic process as a function thereof; two or more segregated hardware port-specific storage spaces, each physically isolated in hardware from any other of said hardware port-specific storage spaces, operatively linked to a corresponding hardware port via a corresponding hardware link, and storing respective secured hardware port-specific cryptographic data thereon exclusively retrievable upon said given input hardware port-specific cryptographic data corresponding thereto and being received via said corresponding hardware port such that said respective secured hardware port-specific cryptographic data is inaccessible in hardware upon said given input hardware port-specific data being received via a distinct hardware port; and a cryptographic engine operable to execute said cryptographic process based on said secured port-specific cryptographic data retrieved from said segregated hardware port-specific storage spaces as a function of said given input port-specific cryptographic data.

In one embodiment, at least one said hardware link invokes a trusted metering function operable on hardware port-specific data communicated therethrough, wherein said trusted metering function is operable to track transactions communicated on a given hardware channel and output cryptographically authenticated metering messages accordingly.

In one embodiment, at least one said hardware link invokes a trusted flow control function, wherein said trusted flow control function applies cryptographically authenticated flow control restrictions on transactions communicated on a given hardware channel.

In one embodiment, at least one said hardware link invokes a trusted function expander, wherein a data transaction relayed or triggered on a given input hardware channel is securely distributed and synchronized across multiple output hardware channels.

In one embodiment, at least one said hardware link invokes a trusted controllable event counter.

In one embodiment, the trusted controllable event counter applies cryptographically authenticated control over a designated event counting threshold thereof such that a trigger invoked upon reaching said threshold is securely adjustable.

In one embodiment, the trusted controllable event counter is operatively associated with an onboard clock frequency signal to securely adjust output timing data associated therewith.

In one embodiment, a given segregated hardware port-specific storage space is exclusively accessible in hardware, independent of said given input hardware port-specific cryptographic data, via said corresponding hardware link.

In one embodiment, each said segregated hardware port-specific storage space is physically isolated in hardware from any other said segregated hardware port-specific storage space.

In one embodiment, the cryptographic engine comprises distinct hardware port-specific cryptographic engines or a same said cryptographic engine that is commonly operable to execute a same said cryptographic process for each of said secured port-specific cryptographic data irrespective of hardware port-specificity.

In one embodiment, each of said segregated hardware port-specific storage spaces comprises distinct partitions of a common embedded storage media each operatively hardwired to said corresponding one of said hardware ports.

In one embodiment, each said segregated hardware port-specific storage space comprises distinctly embedded storage media operatively hardwired to said corresponding one of said hardware ports.

In accordance with another aspect, there is provided a hardware security module comprising: two or more hardware ports, each one of which operable to electronically receive given input hardware port-specific cryptographic data thereon to initiate execution of an internal cryptographic process as a function thereof; two or more segregated hardware port-specific storage spaces, each operatively linked to a corresponding hardware port via a corresponding hardware link, and storing respective secured hardware port-specific cryptographic data thereon exclusively retrievable upon said given input hardware port-specific cryptographic data corresponding thereto and being received via said corresponding hardware port; a cryptographic engine operable to execute said cryptographic process based on said secured port-specific cryptographic data retrieved from said segregated hardware port-specific storage spaces as a function of said given input port-specific cryptographic data; and a hardwired port interconnection matrix that operatively interconnects at least some of said hardware ports in accordance with predefined hardwired port-specific logic and invokes an embedded communication channel resource operable on selected hardware port-specific data communicated via said matrix.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein.

Figure 1:
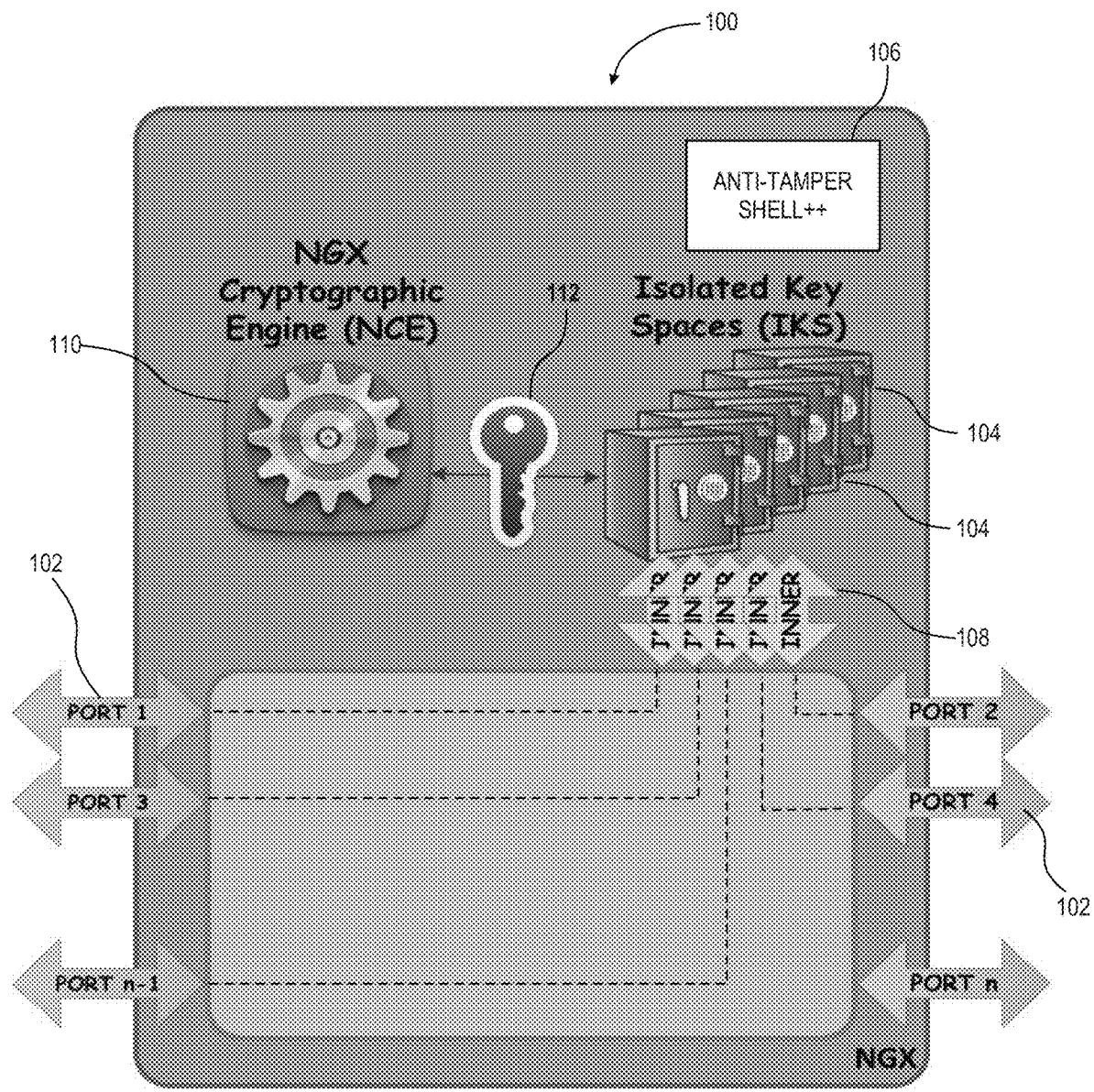
FIG. 1 is a schematic diagram of a hardware security module (HSM), in accordance with one embodiment.

Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Various apparatuses and processes will be described below to provide examples of implementations of the system disclosed herein. No implementation described below limits any claimed implementation and any claimed implementations may cover processes or apparatuses that differ from those described below. The claimed implementations are not limited to apparatuses or processes having all of the features of any one apparatus or process described below or to features common to multiple or all of the apparatuses or processes described below. It is possible that an apparatus or process described below is not an implementation of any claimed subject matter.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, ZZ, and the like). Similar logic may be applied for two or more items in any occurrence of "at least one . . . " and "one or more . . . " language.

The systems, devices and methods described herein provide, in accordance with different embodiments, different secure network hardware solutions, for instance, such as a trusted hardware network interconnection device (matrix), that can be utilized, alone or in combination with an integrated HSM, to provide various trusted network interconnection resources, services and/or solutions.

As noted above, the systems and methods described herein also provide, in accordance with different embodiments, different examples in which a hardware security module (HSM) is operable to concurrently service multiple applications and/or functions while minimizing system security risks that may otherwise be introduced when interfacing with a traditional HSM via an intermediary HSM access appliance, application layer or HSM access software.

For instance, in some embodiments, the HSM comprises a plurality of hardware ports, each one configured or reconfigurable to receive input (e.g. public data, public key, etc.) thereon to execute a designated cryptographic process within the HSM in servicing a particular computational process, application or function. In general, received input data will be port-specific in that only input cryptographic data specific to the port on which it is received can be successfully processed. To do so, each hardware port will generally have defined in association therewith a corresponding hardware link or channel (e.g. static and/or reconfigurable hardware link, channel and/or switch) to a segregated hardware storage media that stores secured port-specific cryptographic data thereon exclusively retrievable for processing as a function of received input data specific to that hardware port. For example, distinct embedded storage resources may be provided with respective hardware data links to their corresponding port, as can distinct storage partitions and/or zones be defined within a same embedded memory storage resource and accessed via dedicated hardware logic or the like. Namely, distinct embedded storage spaces or resources may encompass a physically segregated, separated and/or defined hardware storage space on one or more hardware storage devices (i.e. memory board, chip, component, etc.) that is physically paired, allocated and/or associated with a given port-specific cryptographic process. Each storage space may be designated or adapted to store one or more cryptographic keys and/or like cryptographic data usable in invoking and/or executing a given port-specific process. Accordingly, in some embodiments, a dedicated memory space may define a secure key space for a given cryptographic process and/or encompass storage capacity for other types of cryptographic and/or other related data. An integrated cryptographic engine, executed by an embedded or hardware linked processor, can then be invoked to internally process the retrieved secured cryptographic data, for instance in conjunction with the input data, to produce an intended computation result.

Accordingly, the entire process can be relegated to the hardware space without invoking a software or application layer and thus, without opening the HSM to tampering opportunities that may otherwise present themselves in conventional HSMs, such as traditional network-attached HSMs. Conversely, the HSM embodiments described herein allow for a full, and in some embodiments a single-chip (i.e. static or reconfigurable (e.g. FPGA)) hardware solution that can be used to concurrently service multiple applications and/or processes from within a same tamper-resistant environment. Accordingly, the solutions provided herein may allow for a significant increase in security protocol ratings while also significantly reducing, in some embodiments, the hardware footprint required to implement complex network security architectures that, in most cases, would require the co-location of multiple distinctly executed HSMs internetworked with various external devices in a complex cabled architecture. Further illustrative details, examples, advantages and features will be described below with reference to exemplary embodiments.

With reference to FIG. 1, and in accordance with one exemplary embodiment, a hardware security module (HSM), generally referred to using the numeral 100, will now be described. In the illustrated embodiment, the HSM 100 generally comprises a plurality of hardware ports 102 each operatively linked through hardware, e.g. direct hardware link or channel logic 108, to a corresponding port-specific hardware storage resource and key space 104 (e.g. distinct embedded memory storage device, hardware memory storage partition and/or zone). Each storage resource 104 can be configured to store secured port-specific cryptographic data (e.g. private encryption/decryption key 112) that is only retrievable upon input of corresponding input cryptographic data from a corresponding port. In other ports, secured data may be further secured by virtue of hardware port specificity, whereby input data received on an incorrect hardware port will fail to access corresponding secured data linked to this incorrect port, and also fail to access secured data linked with any other port.

Upon successful input of external data via an appropriate hardware port 102, corresponding secured data (e.g. key 112) can be internally retrieved and processed by an integrated engine (i.e. cryptographic engine 110) to deliver a desired outcome.

To further enhance anti-tampering measures, in some embodiments, the HSM 100 may be enclosed within a tamper-proof or resistant box, container or shell 106.

As noted above, the provision of hardware-linked HSM ports and segregated storage resources enhances overall system integrity and resilience to external tampering, while also providing the added benefit of HSM multiplicity within a common tamper-resistant shell. In fact, certain embodiments may efficiently multiply HSM resource allocations within a single chip implementation, e.g. with embedded memory(ies), processor(s) and hardware logic, while leveraging both the added security of distinctly segregated hardware-linked storage resource interfaces and the option to share internal hardware resources, such as a common integrated cryptographic engine 110 that may be invoked to concurrently or at least sequentially process secured data from multiple isolated key spaces 104. As will be described in further detail below, this integrated hardware implementation may further benefit the deployment of integrated secure system architectures, such as multi-level security system architectures and the like, all within the confines of a single hardware casing or shell, if not integrated onto a singular circuit board in some embodiments.

Figure 2:
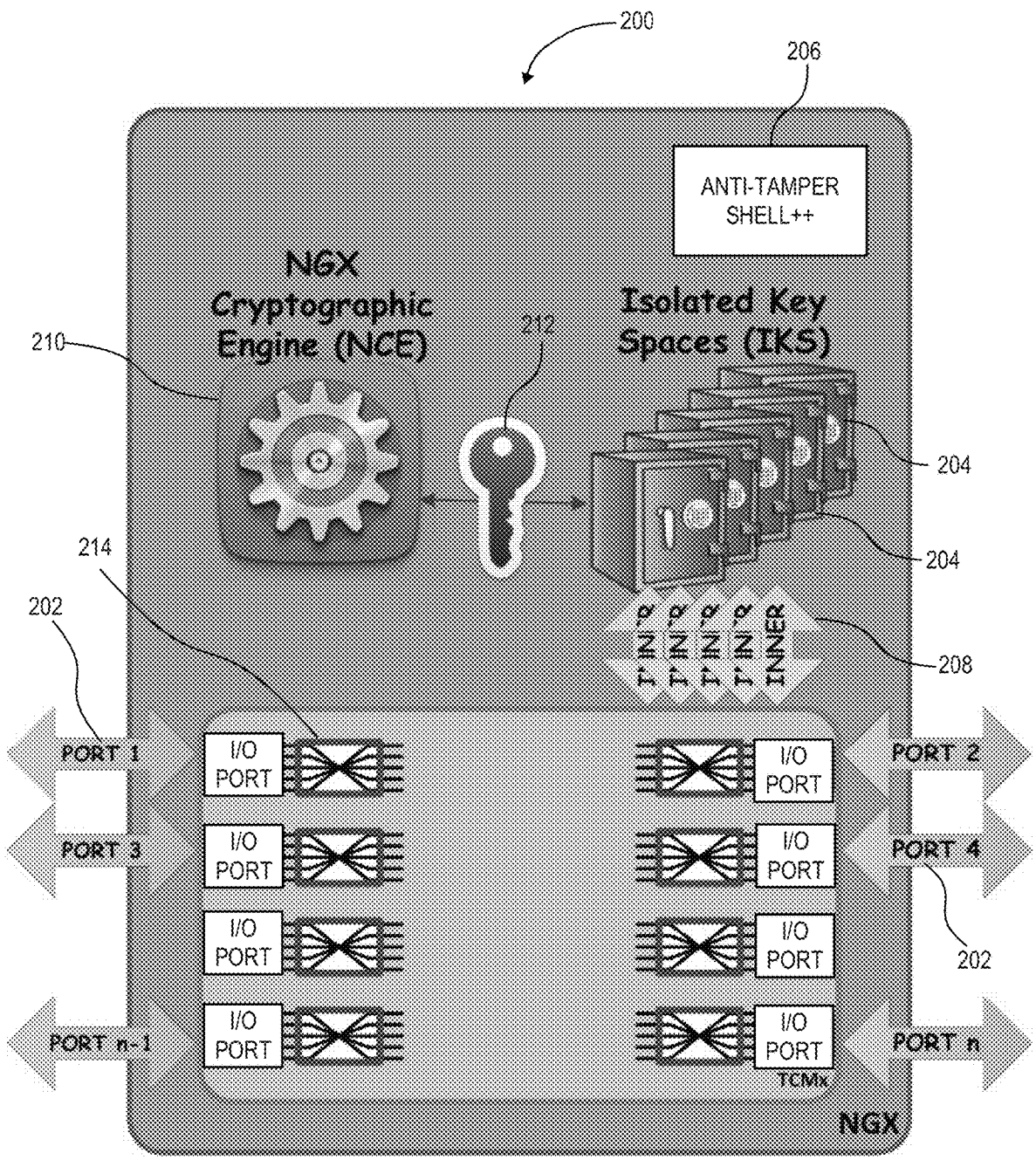
FIG. 2 is a schematic diagram of a hardware security module (HSM), in accordance with another embodiment.

With reference to FIG. 2, and in accordance with another embodiment, a HSM 200, much as described above with reference to FIG. 1, will now be described. In this embodiment, the HSM 200 again generally comprises a plurality of hardware ports 202 each operatively linked through hardware to a corresponding port-specific hardware storage resource and key space 204, in which secured port-specific cryptographic data 212 can be stored and securely retrieved to execute one or more cryptographic processes via an integrated engine 210.

In this embodiment, however, at least some of the hardware ports 202 can be linked through hardware to interface with distinct storage resources 204 and/or ports 202, and/or processes/data associated therewith, thereby defining a trusted communication (e.g. hardwired port interconnection) matrix 214 that can be leveraged in more complex system implementations to benefit from the secured co-location of distinct resources on a same hardware implementation (e.g. same hardware chip) without exposing the HSM 200 to external or software-related tampering risks. In other words, port-specificity can be maintained to govern access to secured data in executing selected cryptographic processes, as described above with reference to FIG. 1, but further enhanced by leveraging predefined hardware interconnections (i.e. data channels) between port-specific resources and/or data allocations. The trusted communication matrix 214 can be implemented as a set of static hardware relays and/or logic, and/or dynamically implemented via reconfigurable hardware logic and/or relays. Accordingly, certain port-specific processes invoked by input data received via a particular port interface may be configured to depend from upstream cryptographic processes executed in respect of cryptographic data received on another hardware port and used to retrieve distinctly stored and maintained private data. Naturally, certain cryptographic processes may equally feed downstream processes executed in respect of a distinct port-specific data resource. Given the hardware implementation of the matrix 214, system security logic and complex data channeling can be hardwired into the HSM 200 and thus minimize external exposure to tampering. Given the above, it will be appreciated that while some ports 202 may be associated with corresponding storage resources 204 in a one-to-one fashion, other port interconnection scenarios may be invoked to logically associate a same port with distinct storage resources, as can distinct storage resources may be logically associated with a same hardware port. Likewise, additional hardware port interfaces may be defined to execute certain channel interconnection configurations without necessarily forming a direct link with any particular storage resource, for example.

As will be described in greater detail below, such variability and customizability may allow for the deployment and execution of different trusted hardware network interconnection solutions, such as for example, in linearly channeling port-specific data transactions between hardware ports in one or more one-to-one hardware port interconnection configurations (e.g. to provide (cryptographically) secure/trusted hardware-segregated port-specific processing paths), in consolidation/merging/multiplexing distinct data channels inbound via distinct hardware ports in a many-to-one configuration (e.g. to provide (cryptographically) secure/trusted data/transaction convergence processing paths), and/or in distributing and/or demultiplexing a single network source across multiple port-specific resources, services and/or data communication paths in parallel in a one-to-many configuration (e.g. to provide (cryptographically) secure/trusted data/transaction distribution/dissemination across multiple data channels from a trusted/reliable source).

In accordance with different illustrative embodiments, different non-limiting examples of single-chip hardware solutions may be considered. In some embodiments, a Xilinx's System on Chip (SoC) or Multi-Purpose SoC (MPSoC) product may be used, such as Zynq® and Zynq® UltraScale+™ respectively. The Zynq® product line is known to contain 2 ARM processors, memory components and Field Programmable Gate Array (FPGA) while the Zynq® UltraScale+™ has 6 ARM processors, memory components and FPGA. In a first exemplary embodiment, the Zynq® device may be used wherein one of the two ARM processors implements the cryptographic engine (CE) 201, a second ARM processor handles all memory accesses and the FPGA implements the trusted communication matrix 214 between external communication ports and internal memory and cryptographic engine capability. In a second exemplary embodiment, the Zynq® UltraScale+™ is used wherein 5 of the 6 ARM processors are used as independent CEs while the sixth processor is used for handling all memory accesses and the FPGA implements the trusted communication matrix 214 between the external communication ports, internal memory and cryptographic engine capability. In a third exemplary embodiment, the Zynq® UltraScale+™ is used where all of the 6 ARM processors are utilized as independent CEs managing their own memory space and the FPGA implements the trusted communication matrix 214 between the external communication ports, internal memory and cryptographic engine capability. Other known and future technologies, hardware configurations and products may also be considered, as will be readily apparent to the skilled artisan, without departing from the general scope and nature of the present disclosure.

Figure 3A:
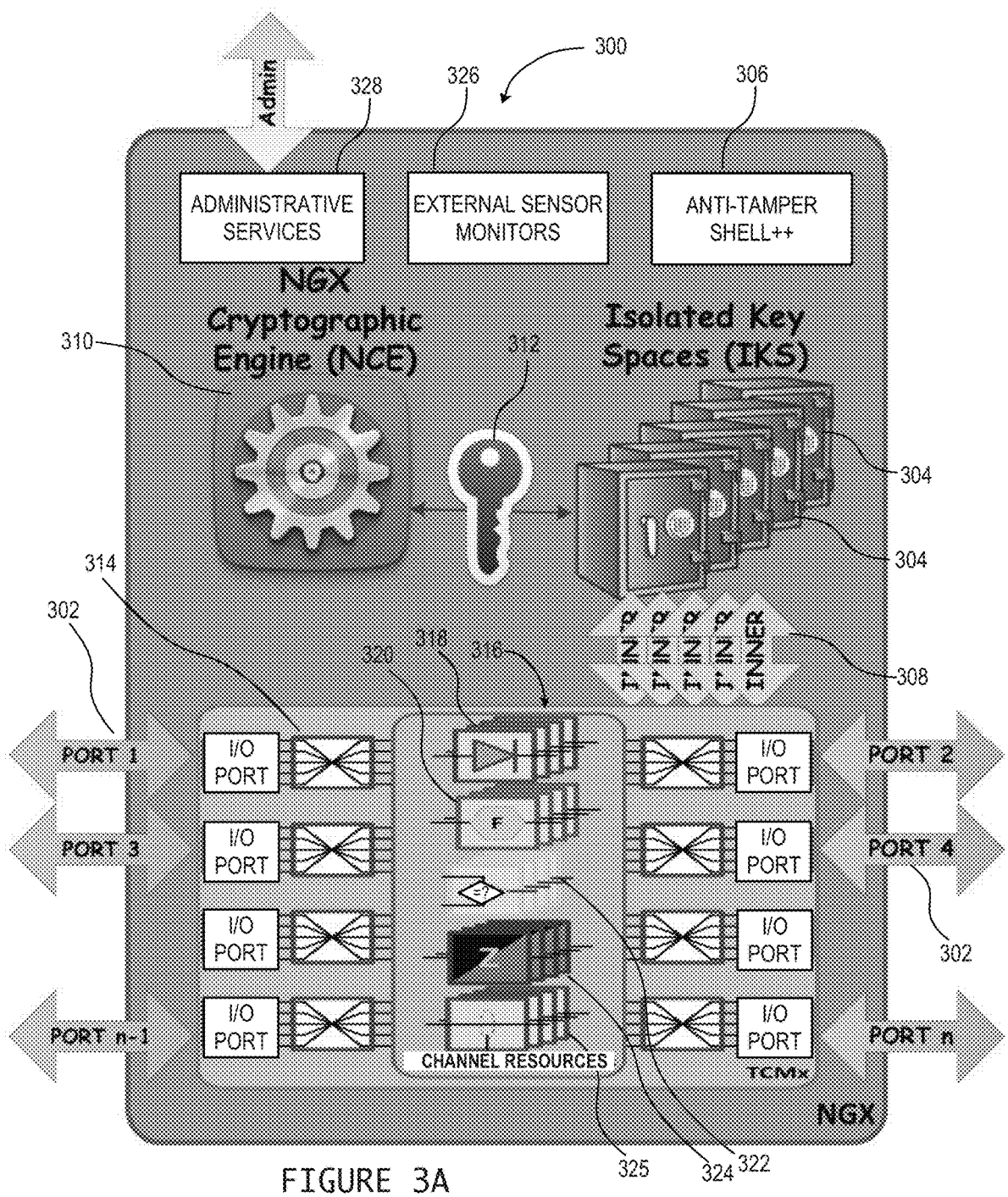
FIG. 3A is a schematic diagram of a hardware security module (HSM), in accordance with yet another embodiment.

With reference to FIG. 3A, and in accordance with yet another embodiment, a HSM 300, much as described above with reference to FIGS. 1 and 2, will now be described. In this embodiment, the HSM 300 again generally comprises a plurality of hardware ports 302 each operatively linked through hardware to a corresponding port-specific hardware storage resource and key space 304, in which secured port-specific cryptographic data 312 can be stored and securely retrieved to execute one or more cryptographic processes via an integrated engine 310.

As with the embodiment of FIG. 2, at least some of the hardware ports 302 can be linked through hardware to interface with distinct storage resources 304 and/or ports 302, and/or processes/data associated therewith, thereby again defining a trusted communication matrix 314. The 314 can again be implemented as a set of static hardware relays and/or logic, and/or dynamically implemented via reconfigurable hardware logic and/or relays.

In this embodiment, however, the matrix 314 may further invoke certain embedded channel resources 316 so to further enhance interconnection logic between ports and port-related processes, and thus allow for embedded security logic integration within the HSM's integrated hardware architecture. These channel resources 316 may be integrated and invoked in a one-to-one fashion, for instance, with integrated port specificity in fully maximizing secure process isolation, or again provided as a shared resource (one-to-many and/or many-to-one) that may be invoked and implemented for different port-specific processes albeit without exposing any such processes to undue external tampering risks.

In the illustrated embodiment, different channel resources are schematically illustrated to include any one or more of a data channel diode 318 (i.e. to restrict data flows on a defined channel to a designated direction), data channel filter 320 (i.e. to filter channel data, for example, to limit throughput data to a particular subset of retrieved data, or again to systematically reconfigure or replace designated data elements on a given channel data path), a channel comparator 322 (i.e. to invoke channel logic between channels based on a comparison of data being channeled thereon, for example, allowing process throughput only upon matching channel data), an inline encryption function 324 (e.g. to execute inline IPSEC or TLS protocol, for example, and/or to implement an inline VPN or like communication tunnel), or sniffer function (325).

For example, in some embodiments, an inline encryption function may be invoked to facilitate certain encrypted exchange with an end client or application that do not necessarily require access to the cryptographic engine and related higher security protocols. For instance, while critical private key management processes (e.g. control plane processes such as user/client authentication/authorization, authenticated session initiation and configuration, private key generation and management, system management functions, etc.) may be strictly relegated to the cryptographic engine and defined secure key spaces, less critical processes (e.g. communication plane processes, such as authenticated data access transactions, updates, edits, etc.,) for instance executed on the basis of a symmetric and/or ephemeral (e.g. session) key used to expedite processing and communications, may be implemented via the inline channel encryption resource 324. In so doing, the HSM 300 may integrally combine enhanced control plane cryptographic services, as described above, with inline cryptographic services, all within a same hardware design and configuration. This may, for example, readily allow for a singular hardware design, as described herein, to replace an otherwise common network (e.g. banking) architecture in which control plane functions and processes are traditionally relegated to a distinct network interfacing HSM, while session-based cryptographic functions are subsequently channeled through downstream network servers. The integrated configuration discussed herein may further, or alternatively, allow for the integrated execution of a virtual private network (VPN) or even nested VPNs to achieve a layered architecture within a single hardware design rather than to invoke a distributed network architecture in which security protocols are otherwise run on a higher network (e.g. TCP/IP) layer, and thus, more vulnerable to physical or external tampering.

As noted above, a sniffer or like function may also, or alternatively be deployed as an integrated and/or customizable channel resource, for instance, to provide a silent non-bypassable logging or network/channel tapping function to gain visibility on network channel communications. For instance, such channel resources may be non-obstructively used to monitor channel communications and raise a flag or alert upon identifying suspicious or anomalous channel activity, if not shutting down outright communications on this channel until remedial action can be taken.

As noted above, a trusted comparator or like function may be included to merge or otherwise compare data streams on respective hardware channels to increase a security and/or reliability thereof. Likewise, and as also noted above, a demultiplexing or multi-port distribution function (e.g. trusted function expander) may be implemented to securely distribute a same data stream or transaction across multiple hardware port-specific channels. For example, different applications may require for identical data to be distributed in parallel between data channels while ensuring an accuracy and reliability of the data source. Accordingly, by having such data originate or result from a secure process internal to the hardware interconnection device and/or integrated HSM, as described herein, secure replication and parallel distribution of such data across multiple embedded hardware data channels can be reliably executed.

Figure 7:
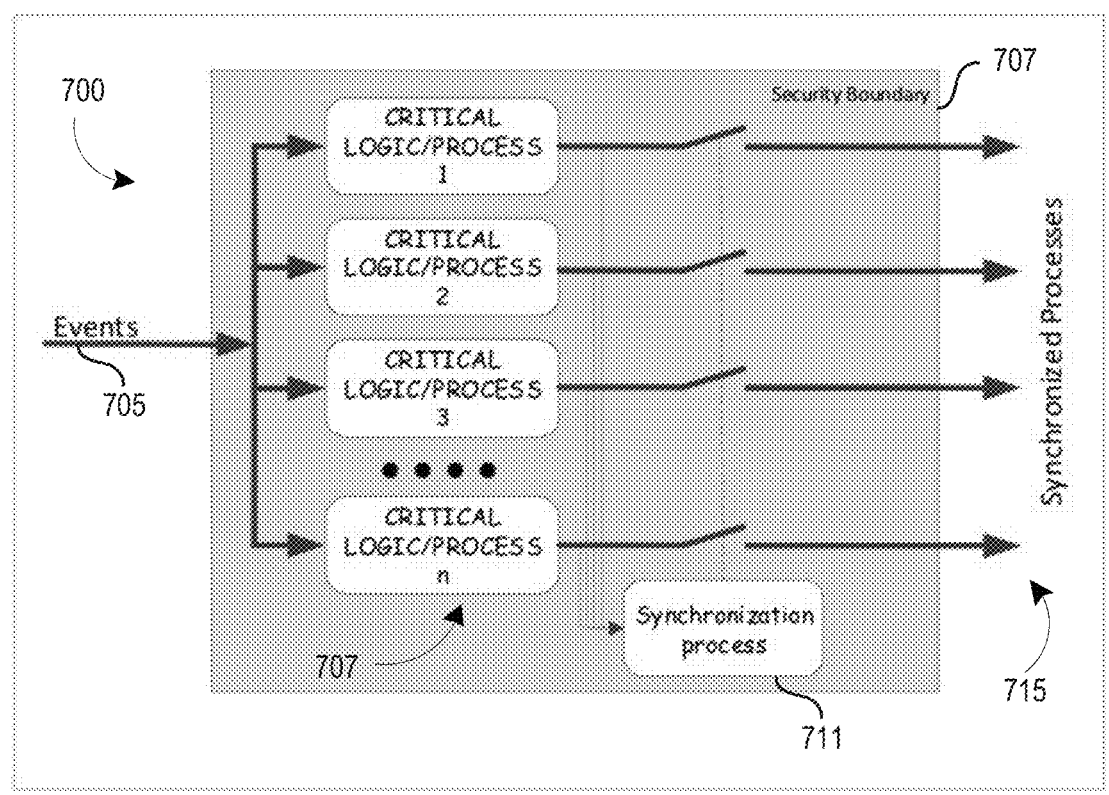
FIG. 7 is a schematic diagram of an exemplary multi-port distribution function for a secure application, in accordance with one embodiment.

With reference to FIG. 7, and in accordance with one embodiment, an exemplary multi-port distribution function, generally referred to using the numeral 700 will now be described. In this exemplary embodiment, an incoming event/data transaction/process 705 is received via an embedded hardware port-specific data channel of hardware interconnection device and/or integrated HSM 707. Event 705 is split into a multiplicity of identical events 707, each comprising the exact same data content as the original event 705; wherein each event is processed by its own critical logic function 707. Each critical logic function leverages the embedded hardware to realize a synchronization process 711, wherein the multiplicity of events/processes are all synchronized upon exiting hardware interconnection device and/or integrated HSM 707 on their own embedded port-specific hardware data channels 715.

Examples of multi-channel data distribution applications may include, but are not limited to, the secure distribution of a synchronized network time stamp or clock (for example, in the management or maintenance of highly synchronized network resources), which trusted time can originate from a single trusted resident high precision timing device (e.g. see timing device 444 of FIG. 4) based on resident and/or accessible high precision atomic clock cycles and/or applicable GPS time data, for example. Using the secure centralized hardware architecture of a particular network interconnection matrix as described herein, identical time stamps or like data packets/details (e.g. headers, payload, flags, tags, etc.) may be securely, accurately and reliably distributed across multiple hardware (port-specific) data channels, in parallel at the same time (e.g. reliable, monitored distribution time) and while minimizing possible data tampering/alterations between ports.

Following from the above-noted time distribution example, another application that may extend therefrom includes the provision of reliable distributed time smearing between multiple hardware-port specific resources, such as for example, across a large network of interconnected network resources each ultimately relying on a central reliable time source, such as that illustratively provided by the resident high precision timing device of the herein-described embodiments. In this particular example, UTC leap seconds can be progressively smeared over a designated time period prior to and/or after (e.g. 6, 12 or 24 hours before/after) a particular UTC leap second is to take effect, thereby effectively smearing the temporal impact of the leap second over such time period to avoid an instantaneous jump or gap, provided such smearing is equally applied to all related network devices. Using an embodiment of the secure network device/appliance described herein, effective time smearing can be securely, reliably and identically applied to a number of interconnected network resources provided such resources are configured to uniformly rely on the central time smearing functionality of the appliance. To do so, the hardware implemented multi-channel data distribution technique described above can be used to reliably source the internal clock cycles and/or UTC time credentials of the appliance to define accurate time and/or time smearing references (e.g. by temporarily reducing/increasing atomic clock cycle counts to accommodate for one or more leap seconds to be applied at a designated time) and uniformly distribute such time references in parallel across multiple hardware-port specific resources while minimizing tampering and/or mis-synchronization risks. Likewise, for example within the context of a multi-level network or appliance interfacing with distinct security zones/levels, synchronized time and/or smearing may be reliably and securely distributed across multiple zones simultaneously. In yet another example, the interconnection matrix may also or alternatively include one or more channel traffic metering and/or gating functions. For example, similar to the sniffer function described above, one or more hardware channels may include or be embedded with an inline resource to monitor and/or control a flow of data and/or transactions on this channel. For example, an active gating function may enforce a particular data/transaction gating schedule whereby certain data transactions invoking this hardware channel can only be executed at select times and/or intervals (e.g. once every minute, every few seconds, every hour, every day, etc.). This may be applied, for example, given a particular service model that only authorizes a certain throughput of transactions given a particular payment model, or again for a certain service level. In other examples, scheduled gating functions may rather or also be applied to enhance security protocols, whereby transaction and gating schedule synchronization is required to successfully execute a particular transaction or process (e.g. data access or user authentication only permitted at designated times or intervals), and whereby unsynchronized access results in a block service/resource and/or flag to a system administrator.

Gating may also or alternatively include start/stop, duration, frequency, volume and/or duration metering thresholds, whereby accessed services are limited based on security thresholds (e.g. a sudden surge in activity raising security concerns), service model (e.g. payment model based on a number of transactions per unit time) and/or security access windows, to name a few examples.

Figure 8A:
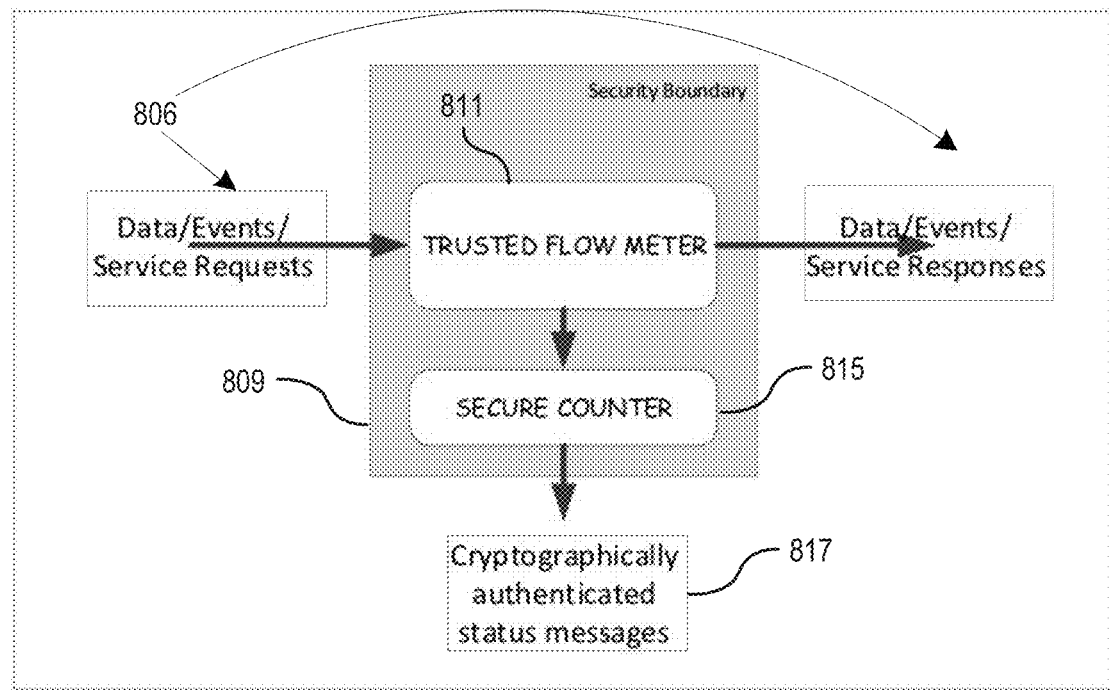
FIGS. 8A and 8B are schematic diagrams of a trusted metering and trusted flow control function, respectively, for a secure application, in accordance with one embodiment.
Figure 8B:
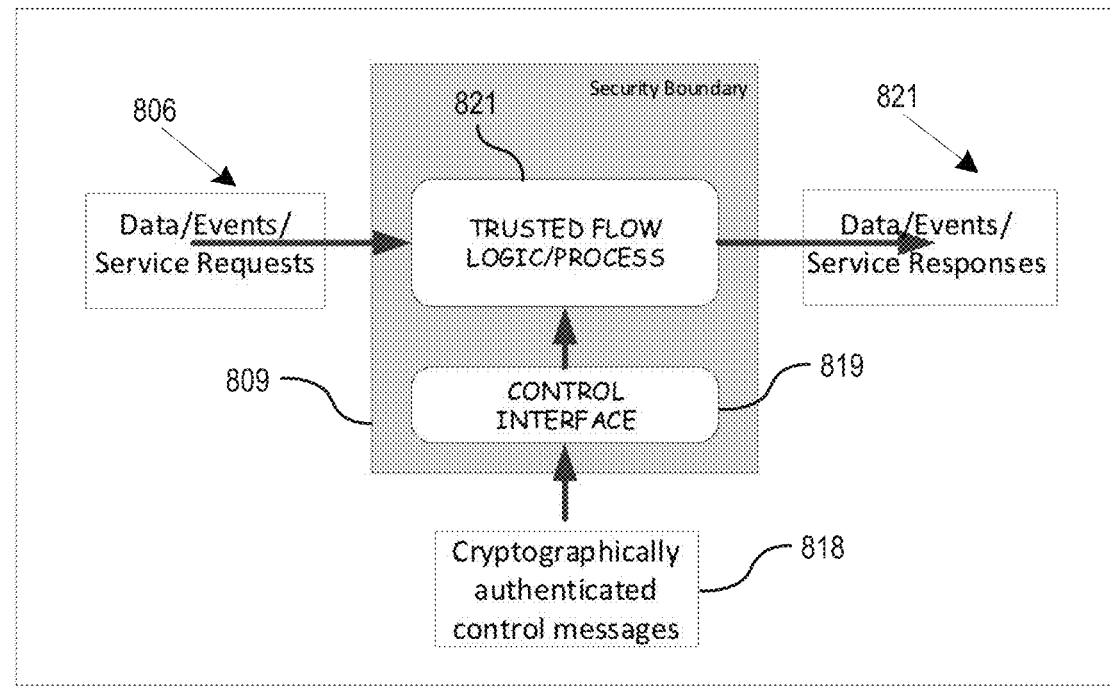

With reference to FIG. 8A, and in accordance with one embodiment, a trusted metering function, to be implemented within the hardware interconnection device and/or integrated HSM described above, and generally referred to using the numeral 800, will now be described. In the exemplary embodiment of FIG. 8A, a number of discrete incoming digital events, data, processes and/or service requests per unit time 806 may be tracked and/or monitored in a trusted fashion. As shown in FIG. 8A, the flow of discrete data/events 806 entering and exiting hardware interconnection device and/or integrated HSM 809 via embedded hardware data channels is channeled through a trusted flow meter function 811, which is operable to measure said flow (number per unit time) of incoming events travelling through hardware interconnection device and/or integrated HSM 809. The measurement is sent to a secure counter function 815, which is operable to produce and record cryptographically authenticated status messages 817. Secure counter 815 cannot be tampered with and the resulting count status messages 817 are strongly authenticated by the counting function. In this embodiment, the flow of data/events/requests is not perturbed but only monitored. In contrast, FIG. 8B shows an exemplary embodiment of a flow control function provided for data flow control. In this exemplary embodiment, a given number of events and/or amount of data flow and/or processed events in a given unit of time may be controlled and/or enforced inside a trusted security boundary provided by hardware interconnection device and/or integrated HSM 809. A control interface 819 is used to modify or manage this functionality via a set of cryptographically authenticated control messages 818 listing a set of conditions under which some of events/data 806 are allowed through the security boundary and exit via a secure data channel to produce an exit data/event flow 821.

Likewise, inline metering of one or more hardware data channels may allow for the provision of certain service models (e.g. fee per transaction and/or per quantum of transactions), and/or various management applications (e.g. monitor when/how certain cryptographic keys, port-specific resources are used, etc.)

Figure 9:
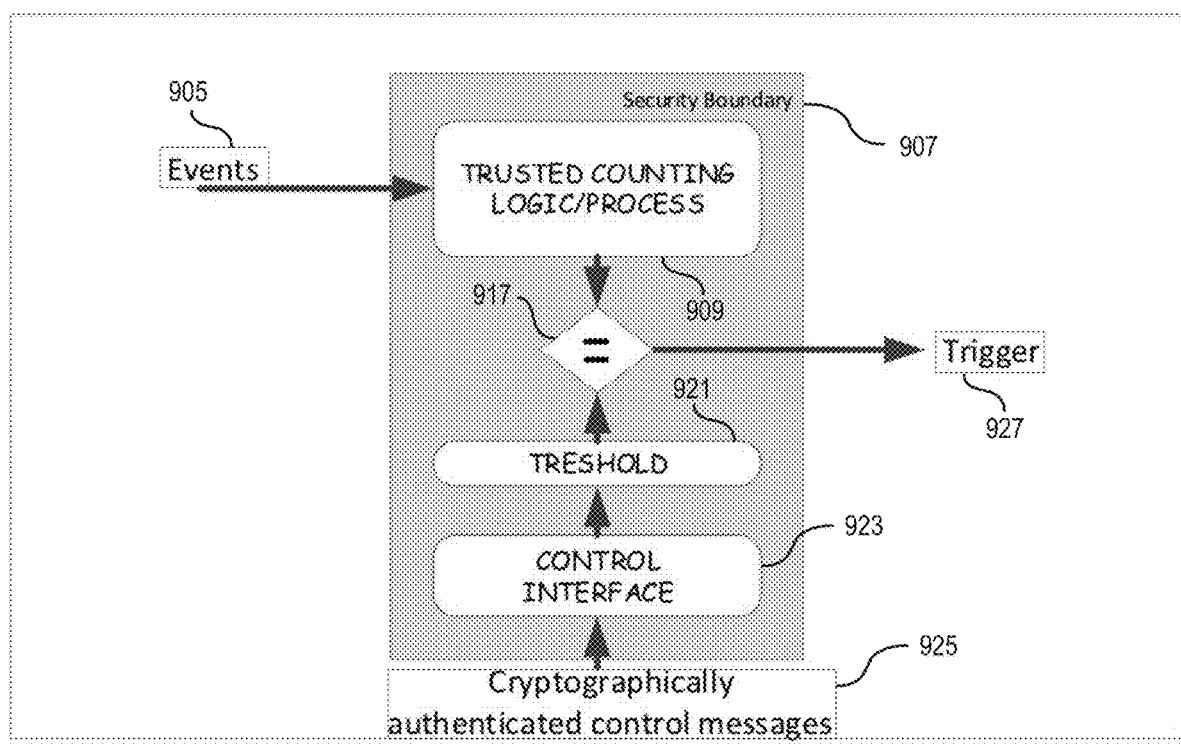
FIG. 9 is a schematic diagram of a trusted controllable frequency function for a secure application, in accordance with one embodiment.

With reference to FIG. 9, and in accordance with one embodiment, a trusted controllable event counter, generally referred to using the numeral 900, will now be described. In this exemplary embodiment, the secure counting feature described above may be leveraged to alter and trigger an output response. As shown in FIG. 9, an incoming event/data/process 905 is received via an embedded hardware data channel into hardware interconnection device and/or integrated HSM 907. Event/data/process 905 is channeled therefrom to a trusted counting logic function 909, which is operable to measure/count the flow or number of events/data/process 905 being received. This number and/or flow of received event/data/processes 905 may be compared via a comparator function 917 via threshold register 921. Upon said threshold being reached, a Trigger signal 927 may be outputted via a port specific hardware channel. The threshold register 921 may be modified via control interface 923, which is authenticated and verified via a set of cryptographically authenticated control messages 925.

The above described trusted controllable event counter may be used to trigger a one pulse-per-second (1 PPS) output signal 927 by counting a stable clock frequency as the input signal 905 and allowing to modify the duration of the 1 PPS period by modifying the threshold register 921. An application that may extend therefrom, combined with the above-described multi-port distribution function, includes the provision of reliable distributed time smearing between multiple hardware-port specific resources, such as for example, across a large network of interconnected network resources each ultimately relying on a central reliable time source, such as that illustratively provided by the resident high precision timing device of the herein-described embodiments. In this particular example, UTC leap seconds can be progressively smeared over a designated time period prior to and/or after (e.g. 6, 12 or 24 hours before/after) a particular UTC leap second is to take effect, thereby effectively smearing the temporal impact of the leap second over such time period to avoid an instantaneous jump or gap, provided such smearing is equally applied to all related network devices. Using an embodiment of the secure network device/appliance described herein, effective time smearing can be securely, reliably and identically applied to a number of interconnected network resources provided such resources are configured to uniformly rely on the central time smearing functionality of the appliance. To do so, the hardware implemented multi-channel data distribution technique described above can be used to reliably source the internal clock cycles and/or UTC time credentials of the appliance to define accurate time and/or time smearing references (e.g. by temporarily reducing/increasing atomic clock cycle counts to accommodate for one or more leap seconds to be applied at a designated time) and uniformly distribute such time references in parallel across multiple hardware-port specific resources while minimizing tampering and/or mis-synchronization risks. Likewise, for example within the context of a multi-level network or appliance interfacing with distinct security zones/levels, synchronized time and/or smearing may be reliably and securely distributed across multiple zones simultaneously.

It will be appreciated that some or all, or again different channel resources may be integrated to provide different interconnection logic and functions between port-specific processes and thus enhance available internal process complexity and flexibility in providing a whole integrated solution, in some embodiments, embedded within a singular HSM chip implementation.

In this particular embodiment, the HSM 300 is further provided with optional external sensor monitors 326, for example, which may take the form of various sensors and/or monitors used to detect and report on system breaches or tampering. For example, sensors may include, but are not limited to, integrated sound sensors that may detect shell impacts or breaks; inclinometers or 3D accelerometers to detect displacement or physical reorientation of the shell; smoke, heat and/or water sensors to detect environmental issues and/or tampering (e.g. multiple temperature sensors can be used to detect tampering via differential internal temperature metering); proximity or motion sensors to detect presence of unauthorized personnel; location or geofencing sensors to detect unauthorized transport of the HSM beyond a designed security zone; and other such sensors as may be appreciated by the skilled artisan.

The HSM 300 may further include an administrator port 338, such as a local USB port or dedicated network port interface to allow for secured administrative access to the HSM 300 and allow for system maintenance and reconfiguration as may be required or desired from time to time. For example, where the HSM 300 is implemented as a reconfigurable chip (e.g. FPGA), certain hardware resources and/or logic may be re-allocated or reconfigured to address system or security protocol changes or improvements. For example, the trusted communication matrix may be adjusted to reflect new port allocations or leverage new or existing channel resources to further enhance security protocols, introduce new security levels or system integrations, or again refine existing protocols with improved processes and functions.

In addition, HSM 300 may allow for software, firmware and/or FPGA updates through a secured validation process. This validation process may, in some embodiments, only accept validated inputs by means of administrative port 338 and/or hardware ports 302 through a "chain of trust" process via digital signatures using quantum safe algorithms, such as hash-based signature algorithms.

As illustratively described above with reference to FIGS. 1 to 3A, in some embodiments, the HSM (100, 200, 300) may be configured to share a common cryptographic engine (110, 210, 310), that is an embedded resources executing one or more cryptographic processed predefined in firmware and secured within the confines of the HSM's hardware architecture. Accordingly, respective secured cryptographic data (e.g. private key data) can be respectively accessed and used by the common cryptographic engine from respective port-specific storage spaces (104, 204, 304) to render secure HSM functions to respective port-specific masters (e.g. users, clients, applications, etc.)

Figure 3B:
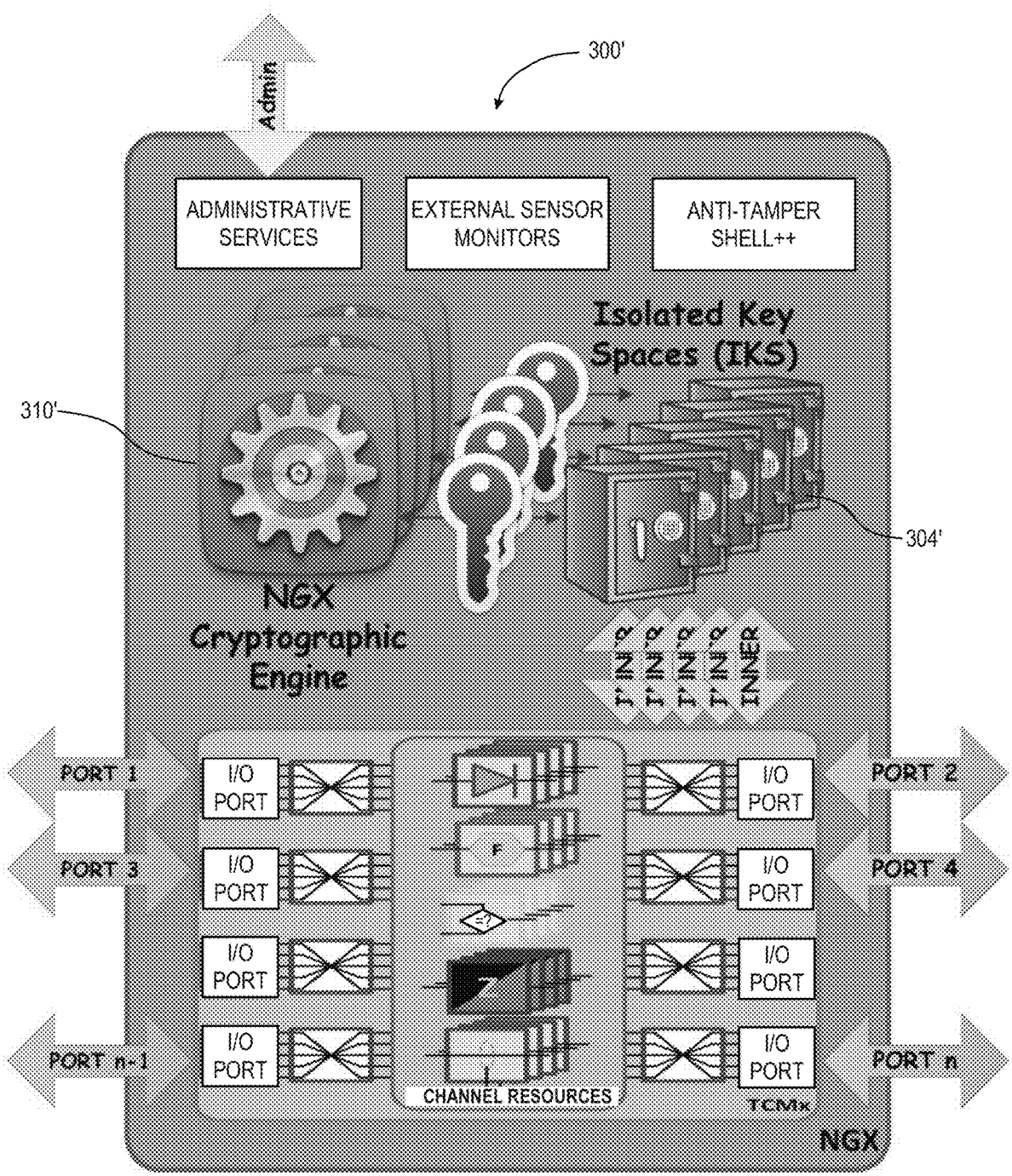
FIG. 3B is a schematic diagram of a hardware security module (HSM), in accordance with yet another embodiment.

With reference to FIG. 3B, an alternative HSM configuration 300' is rather designed to define a respective cryptographic engine 310' for each of the secured key spaces 304'. By replicating cryptographic resources, further hardware isolation (e.g. distinct firmware resources and/or firmware executed on distinct embedded processor cores) can be achieved in thus further enhancing the HSM's tamper resistance.

Figure 3C:
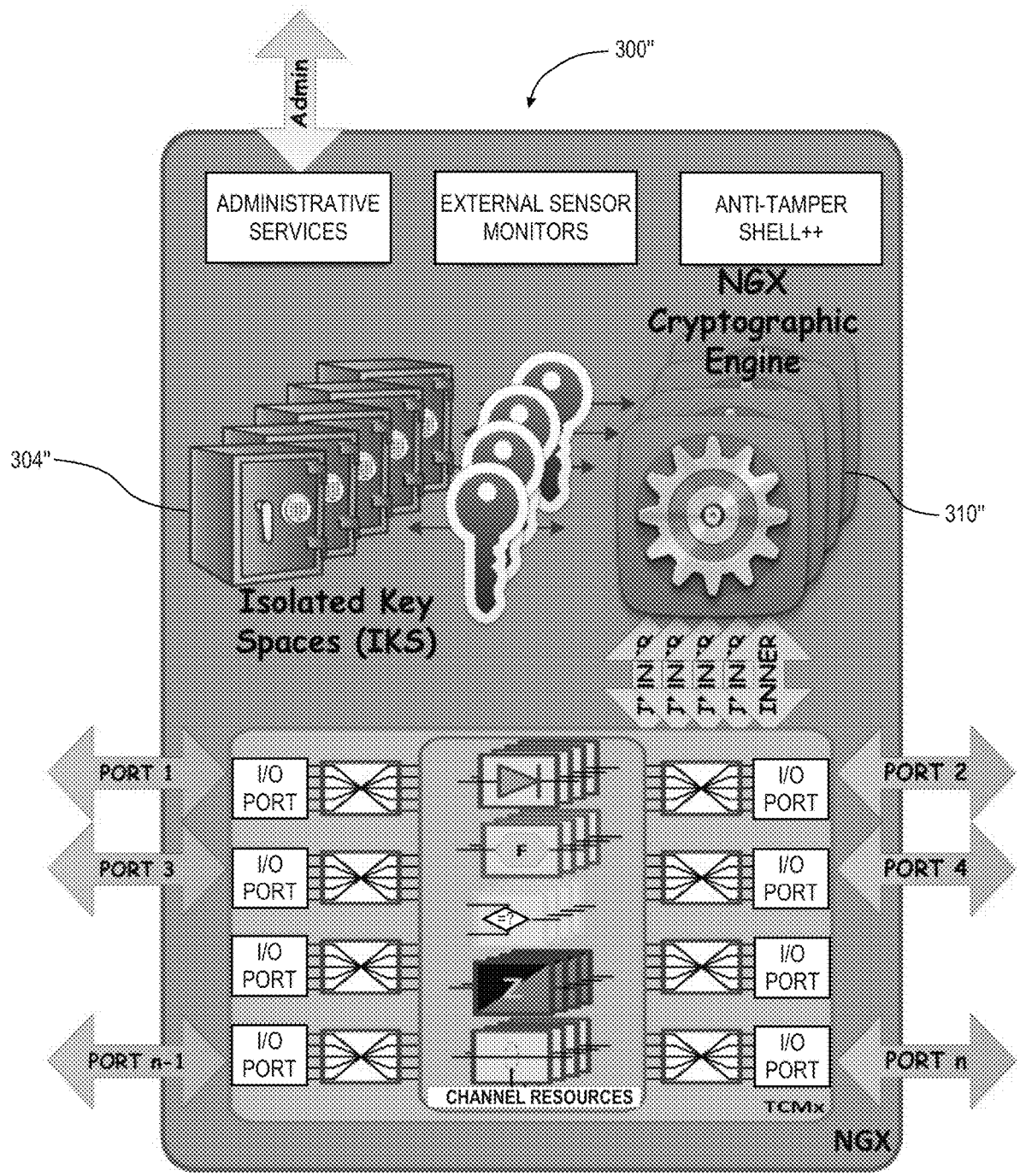
FIG. 3C is a schematic diagram of a hardware security module (HSM), in accordance with yet another embodiment.

In yet another embodiment illustrated in FIG. 3C, an alternative HSM configuration 300" again replicates cryptographic resources 310" for each of the defined key spaces 304", but in this case, embeds these resources within the hardware design so to be invoked before access is granted to the respective port-specific key spaces. This may be particular useful in a context where, for example, storage resources used to define the respective key spaces are provided external to an otherwise embedded HSM chip. In other words, HSM resources may leverage an external storage resource such as a co-located or integrated flash drive or hard drive to store private key or other secured cryptographic data for exclusive access via embedded port-specific cryptographic engines. The person of ordinary skill in the art will appreciate that other configurations may also be considered without departing from the general scope and nature of the present disclosure.

Using different aspects of the above-described embodiments, complex system architectures may be deployed on a single chip, as noted above, or again on a same integrated board design, i.e. where an embedded multi-port HSM can be integrated with other system hardware on a same or interconnected circuit boards to deliver a complex (e.g. multi-purpose, multi-level, multi-tiered, multi-user, etc.) cryptographic service and system as a whole, all in some embodiments, within a same tamper-resistant shell.

Figure 4:
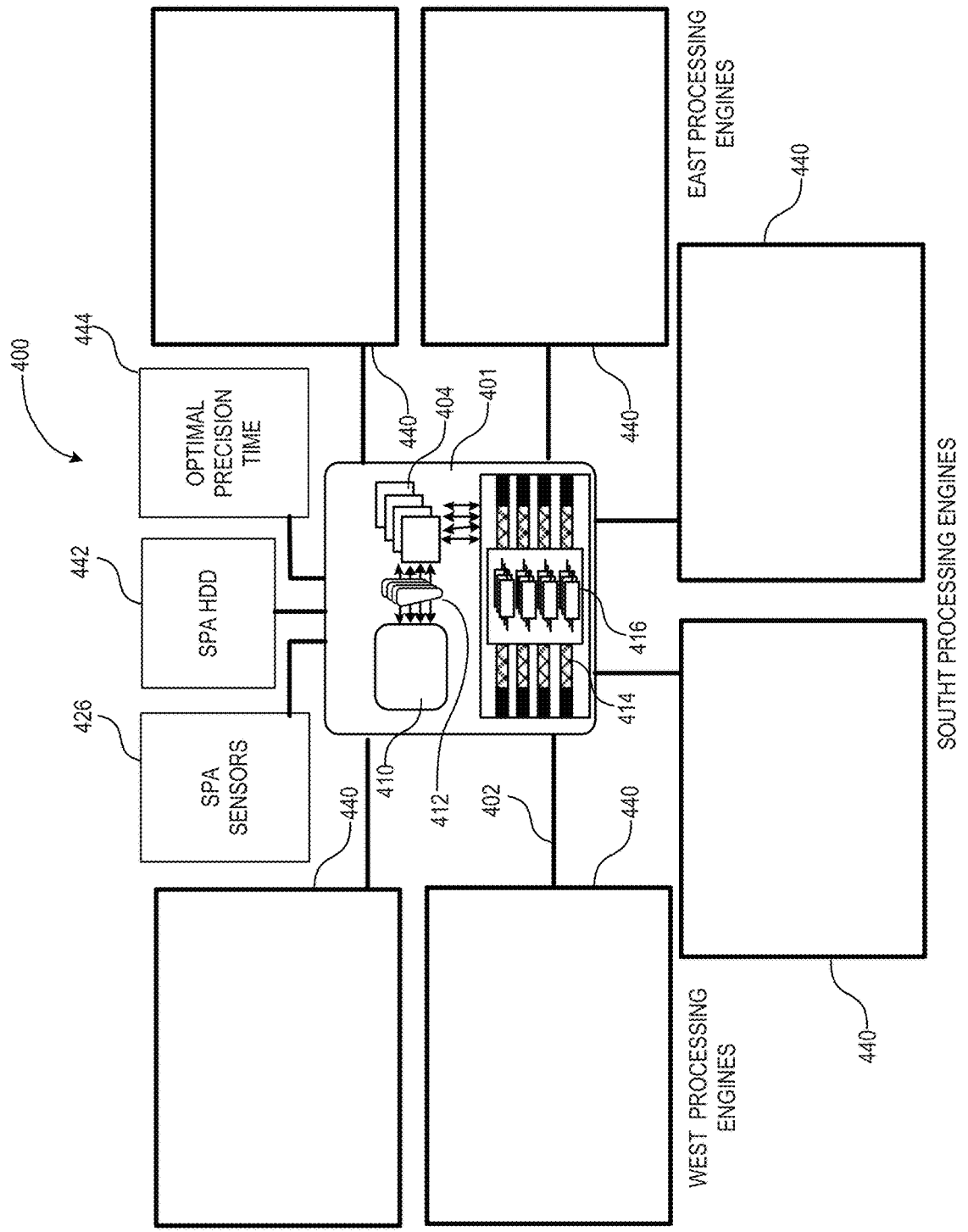
FIG. 4 is a schematic diagram of an integrated security processing system integrating a multi-level HSM interfacing via respective hardware connections with a series of associated processing engines, in accordance with one embodiment.

With reference to FIG. 4, and in accordance with one embodiment, an integrated security processing system 400 will now be described, in which a single-chip HSM 401, much as described above with reference to FIGS. 3A to 3C, is illustratively integrated to act as a multi-function HSM within the integrated system architecture of system 400. In this particular embodiment, the HSM 401 illustratively comprises a plurality of hardware ports 402 each operatively linked through hardware to a corresponding port-specific hardware storage resource and key space 404, in which secured port-specific cryptographic data 412 can be stored and securely retrieved to execute one or more cryptographic processes via an integrated engine 410. Again, hardware ports 402 can be linked through hardware to interface with distinct storage resources 404 and/or ports 402, and/or processes/data associated therewith, to define a port trusted communication matrix 414. The port trusted communication matrix 414 can again be implemented as a set of static hardware relays and logic, and/or dynamically implemented via reconfigurable hardware logic or relays. Embedded channel resources 416 are also optionally provided to further enhance interconnection logic between ports and port-related processes.

Integrated with the HSM 401 are provided distinct processing resources 440 that may be configured to execute various system processes that rely, at least in part, on the cryptographic outputs of the HSM 401, and/or contribute inputs to the HSM 401 to be processed in respect of one or more downstream processes. Generally, these processing resources 440 will include one or more processing engines and storage media encoding various machine executable tasks and instructions to be processed thereby, for example, via one or more accessible processors or the like. Accordingly, a secure data path may be internally routed from one processing engine 440 to the other via the integrated HSM 401, in some embodiments, either internally hardwired via internal cabling or direct circuit board interconnections, so to effectively execute multi-level or multi-function data security system integration within a wholly integrated system implementation.

Furthermore, given the integrated infrastructure of system 400, additional elements may be collocated or integrated with the above-described components to further enhance or extend processing resources and functionality. For example, a central storage device 442 may be included to provide additional secure/internal storage usable in the various processes invoked and implemented by the system 400.

Internal or external system sensors 426 may also be deployed, much as described above with reference to integrated sensor monitors 326 of FIG. 3A, so to effectively monitor for, and detect, any one or more of external/internal shell tampering; unusual/unexpected system displacements, movements, or vibrations; environmental disbursements such as water, fire, heat or smoke; uncharacteristically high system usages and/or unusual usage patterns; etc.

The system 400 may further include and benefit from a resident high precision timing device 444, for instance, in supporting processes where high precision timing may be critical.

Using the above-noted approach, systems that would otherwise require a stack of interconnected devices using a set of networking cables and software-defined network port allocations (and generally at best satisfying commercial software or hybrid security standards such as FIPS 140-2), can now be implemented within a single integrated hardware architecture, that is within a single tamper-resistant shell and optionally, within a single integrated circuit board architecture, reaching security medium assurance (Communication Security Establishment—CSE Canada) security standards or CSfC (Commercial Solutions for Classified—U.S. National Security Agency) standards, and beyond.

Figure 5:
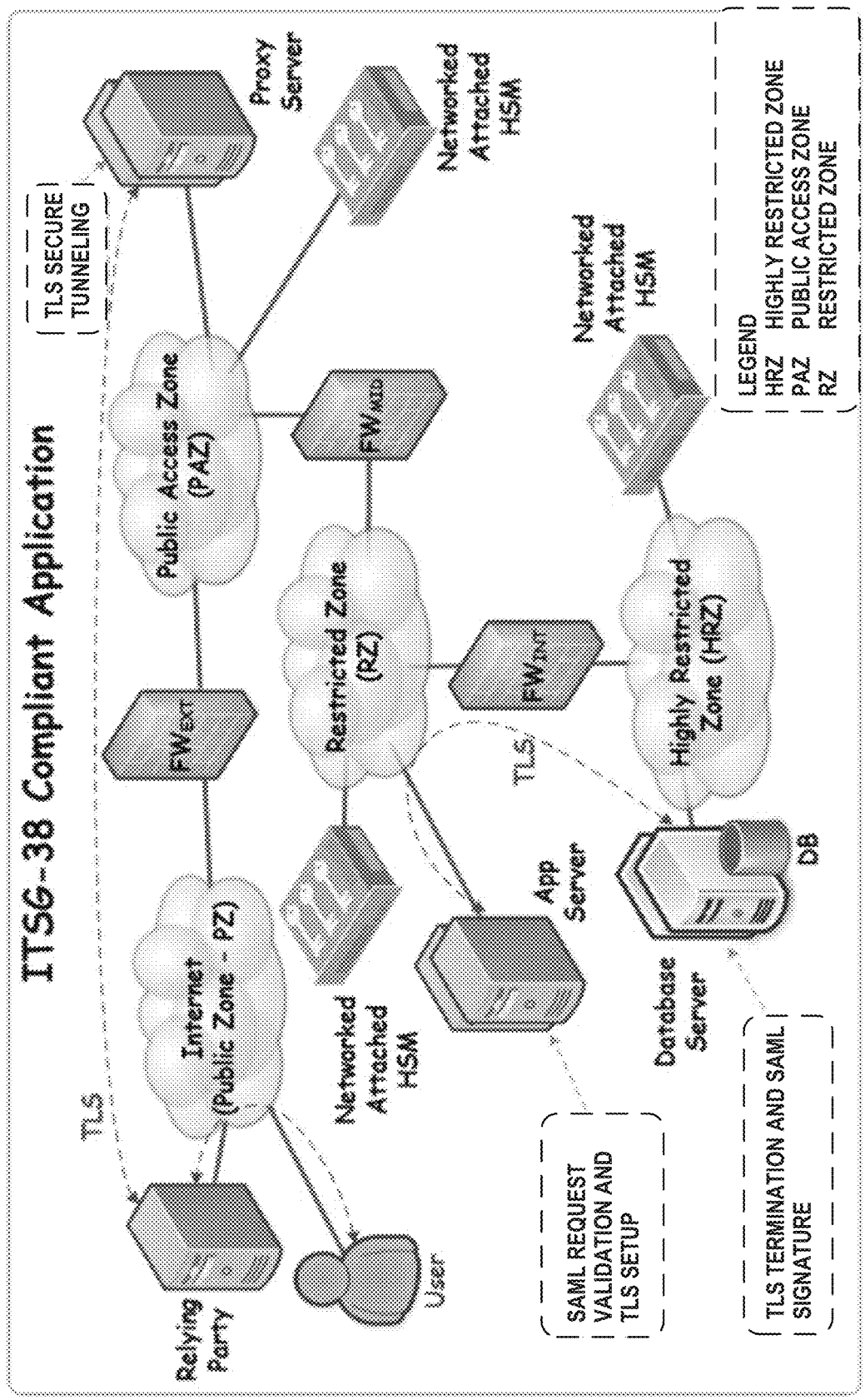
FIG. 5 is a schematic diagram of a network security zoning architecture for a secure application invoking various network security zones, in accordance with one embodiment.

With reference to FIG. 5, a network security zoning architecture is shown (i.e. for an ITSG-38 Compliant Application—see Information Technology Security Guidelines https://www.cse-cst.gc.ca/en/publication/itsg-38) in which a network path is progressively routed through various security zones. For example, a user can establish a communication link within a public zone (PZ, i.e. Internet) with a relaying party, which then seeks to establish a link to a public access zone (PAZ) that is deployed behind an external firewall ($FW_{EXT}$) and serviced by a first network attached HSM and proxy server to establish Transport Layer Security (TLS) Secure Tunneling with the relaying party. A connection is then extended to a restricted zone (RZ) that is itself deployed behind a middle firewall ($FW_{MID}$) and serviced by its own network attached HSM to link into an App Server to initiate a Security Assertion Markup Language (SAML) Request validation and TLS Setup with a downstream database server (DB) deployed within a highly restricted zone (HRZ). The DB server deployed within the HRZ is once again deployed behind its own internal firewall ($FW_{INT}$) and serviced by its own network attached HSM to provide TLS termination and SAML Signature. Generally, using conventional network security zoning equipment, each firewall, HSM, the proxy server, the App server and the database server will constitute a distinct device stacked within a hardware stack and interconnected via a set of network cables, at best reaching a FIPS 140-2 security standard rating (i.e. as defined by Federal Information Processing Standards from the National Institute of Standards and Technology (NIST) for commercial cryptographic modules.

Figure 6:
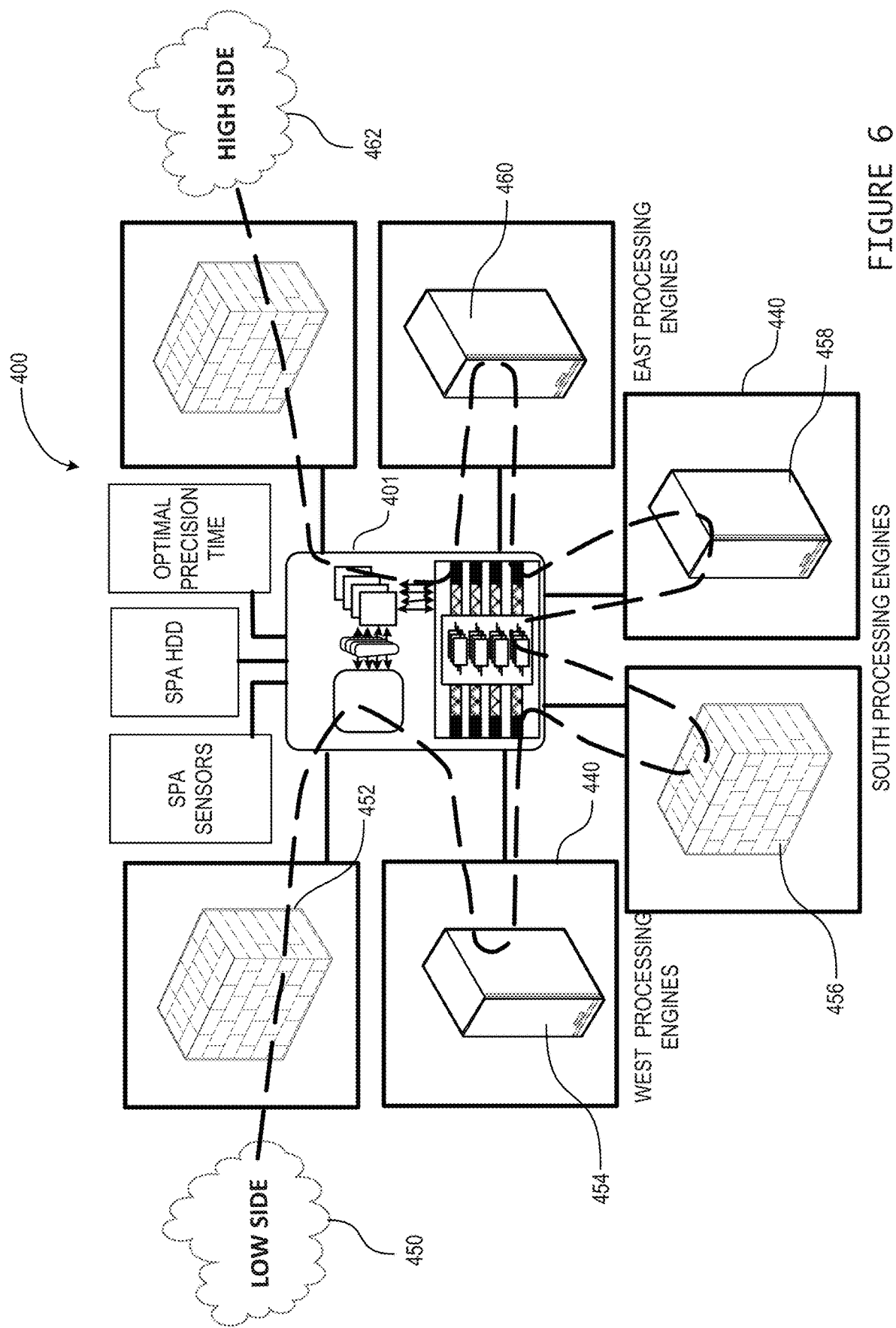
FIG. 6 is a schematic diagram of a network security zoning architecture, such as that illustrated in the embodiment of FIG. 5, deployed within the context of the secured integrated system illustrated in FIG. 4.

As illustrated in FIG. 6, in accordance with one embodiment, the network security zoning architecture described above with reference to FIG. 5 can, in some embodiments, be readily deployed using the integrated system hardware assembly generically described above with reference to FIG. 4. For instance, each integrated processing engine 440 may be configured to implement a different system firewall or server such that a low security network link 450 can be channeled into the integrated device 400 via a first external firewall 452 before invoking the integrated HSM 401 via a first hardware port thereof to invoke a first level security process therewith. Once successfully authenticated by the HSM 401, transaction data can be exchanged with a first processing engine 454 (e.g. proxy server of FIG. 5), which can feed back into the HSM 401 via distinct hardware ports to traverse a second firewall 456 and ultimately invoke a second level security process in order to access a second processing engine 458 (e.g. App Server of FIG. 5). The HSM 401 is again leveraged to invoke a third level security process in order to access a third process engine 460 (e.g. database server of FIG. 5). Conversely, a trusted high security link 462 can provide a more direct access to a high security zone via distinct HSM hardware ports.

As demonstrated above, the integrated security processing system (appliance) 400 of FIGS. 4 and 6, can effectively improve security protocol ratings for a given system architecture while drastically reducing a required hardware rack footprint and associated host maintenance and security requirements. Namely, by integrating a significant portion if not the entire security processing system within a same tamper-resistant shell, optionally with associated tamper-monitoring sensors and/or devices, and further optionally within a same circuit board architecture, significant improvements in whole system security, reliance and maintenance can be realized. For example, noted improvements, features and/or advantages may include, but are not limited to, enhanced application security, out-of-the-box managed security service provider support, multi-tenant ready, higher than FIPS assurance, true hardware-based process isolation, trusted boot applications, secured field updates, quantum resistant cryptography, physical and operation security, to name a few.

Furthermore, while the above provides one exemplary implementation of an integrated security processing appliance, various integrated system applications can be designed to leverage the features, functions and advantages of the above-described embodiments. For instance, an integrated device may be configured to provide a security processing appliance that delivers functionality such as, but not limited to, entropy as a service functionality, smart data diode functionality, trusted data guard functionality, protocol adapters, redundant sanitizing functions, trusted comparators, filter validation functions, dual layer VPNs, or the like.

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Except to the extent necessary or inherent in the processes themselves, no particular order to steps or stages of methods or processes described in this disclosure is intended or implied. In many cases the order of process steps may be varied without changing the purpose, effect, or import of the methods described.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become apparent to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims. Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the disclosure.

What is claimed is:

1. A hardware security module comprising:
   two hardware ports operable to receive hardware port-specific data thereon to initiate execution of an internal cryptographic process as a function thereof;
   two hardware port-specific storage spaces operatively linked to a corresponding hardware port via a corresponding hardware link, and storing respective secured hardware port-specific cryptographic data thereon exclusively retrievable upon said hardware port-specific data corresponding thereto and being received via said corresponding hardware port; and
   a cryptographic engine operable to execute said cryptographic process based on said secured port-specific cryptographic data retrieved from said hardware port-specific storage spaces as a function of said port-specific cryptographic data, wherein a given hardware port-specific storage space is exclusively accessible in hardware, independent of said hardware port-specific cryptographic data, via said corresponding hardware link.

2. The hardware security module of claim 1, wherein the hardware security module further comprises a hardwired port interconnection matrix that operatively interconnects said hardware ports in accordance with a hardwired port-specific logic.

3. The hardware security module of claim 1, wherein at least one said hardware link invokes an embedded communication channel resource operable on selected hardware port-specific data communicated therethrough.

4. The hardware security module of claim 3, wherein said communication channel resource comprises at least one of an inline channel cryptographic resource, a data channel diode resource, a data channel filter resource, a data channel comparator resource, a trusted metering function, a trusted flow control function, a trusted function expander, a trusted controllable event counter, or a data channel sniffer resource.

5. The hardware security module of claim 1, wherein at least one said hardware link invokes a trusted metering function operable on hardware port-specific data communicated therethrough, wherein said trusted metering function is operable to track transactions communicated on a given hardware channel and output cryptographically authenticated metering messages accordingly.

6. The hardware security module of claim 1, wherein at least one said hardware link invokes a trusted flow control function, wherein said trusted flow control function applies cryptographically authenticated flow control restrictions on transactions communicated on a given hardware channel.

7. The hardware security module of claim 1, wherein at least one said hardware link invokes a trusted function expander, wherein a data transaction relayed or triggered on a given input hardware channel is securely distributed and synchronized across multiple output hardware channels.

8. The hardware security module of claim 1, wherein at least one said hardware link invokes a trusted controllable event counter.

9. The hardware security module of claim 8, wherein said trusted controllable event counter applies cryptographically authenticated control over a designated event counting threshold thereof such that a trigger invoked upon reaching said threshold is securely adjustable.

10. The hardware security module of claim 9, wherein said trusted controllable event counter is operatively associated with an onboard clock frequency signal to securely adjust output timing data associated therewith.

11. The hardware security module of claim 1, wherein each said hardware port-specific storage space is physically isolated in hardware from any other said hardware port-specific storage space.

12. The hardware security module of claim 1, wherein said cryptographic engine comprises distinct hardware port-specific cryptographic engines.

13. The hardware security module of claim 1, wherein each of said hardware port-specific storage spaces comprises distinct partitions of a common embedded storage media each operatively hardwired to said corresponding one of said hardware ports.

14. The hardware security module of claim 1, wherein each said hardware port-specific storage space comprises distinctly embedded storage media operatively hardwired to said corresponding one of said hardware ports.

15. The hardware security module of claim 1, wherein said cryptographic engine comprises a same said cryptographic engine that is commonly operable to execute a same said cryptographic process for each of said secured port-specific cryptographic data irrespective of hardware port-specificity.

16. The hardware security module of claim 1, wherein said two hardware ports comprise a plurality of hardware ports, and wherein said two hardware port-specific storage spaces correspondingly comprise a plurality of hardware port-specific storage spaces.

\* \* \* \* \*